US005443215A

United States Patent [19]
Fackler

[11] Patent Number: 5,443,215
[45] Date of Patent: Aug. 22, 1995

[54] APPARATUS FOR ADJUSTING A SHEARBAR RELATIVE TO A CUTTERHEAD

[75] Inventor: Robert L. Fackler, Ephrata, Pa.

[73] Assignee: New Holland North America, Inc., New Holland, Pa.

[21] Appl. No.: 222,533

[22] Filed: Apr. 4, 1994

[51] Int. Cl.$^6$ ............................................. B02C 25/00
[52] U.S. Cl. ................... 241/101.3; 241/37; 241/241; 340/684; 340/686
[58] Field of Search ............ 241/37, 101.2, 101.3, 241/101.7, 222, 239, 240, 241; 73/660; 340/684, 686

[56] References Cited
U.S. PATENT DOCUMENTS

| | | | |
|---|---|---|---|
| 3,583,405 | 6/1971 | Gerhardt et al. | 340/684 X |
| 4,457,165 | 7/1984 | Wiederrich | 73/660 X |
| 4,799,625 | 1/1989 | Weaver, Jr. et al. | 241/37 X |
| 5,140,529 | 8/1992 | Peifer | 73/660 X |

*Primary Examiner*—Timothy Eley
*Attorney, Agent, or Firm*—Griffin, Butler, Whisenhung & Kurtossy

[57] ABSTRACT

In a forage harvester which has an automatically adjustable shearbar mechanism for adjusting the distance between the shearbar and a rotating cutterhead, rotation of the cutterhead is determined by the use of essentially steady state signals without substantial transient components.

5 Claims, 3 Drawing Sheets

APPARATUS FOR ADJUSTING A SHEARBAR RELATIVE TO A CUTTERHEAD

FIELD OF THE INVENTION

The present invention relates to forage harvesters and more particularly to an improved method and apparatus for automatically adjusting the position of a shearbar so that it is parallel to a rotating cutterhead, no operator intervention being required except for actuating a switch to initiate the adjustment operation.

BACKGROUND AND OBJECTS OF THE INVENTION

In U.S. Pat. No. 4,799,625, assigned to the same assignee as the assignee of this application, (and fully incorporated herein by this reference) there is disclosed a method and apparatus in which the adjustment between a rotating cutterhead and a shearbar in a forage harvester is achieved automatically under the control of a microprocessor. According to this prior art patent, insofar as relevant for this application, the adjustment process is controlled in part by sensors and procedures which assure that no adjustment process is allowed to proceed unless the sensors have determined that the cutterhead is rotating at or above a predetermined minimum. As pointed out in the patent, the adjustment mechanism may damage either itself or the cutterhead if the cutterhead is not rotating.

In the prior art patent, the rotation of the cutterhead is determined by a tachometer which generates a pulse-train to indicate rotation of the cutterhead. Electrical signals which represent such pulse-trains, even at relatively low repetition rates, contain significant high-frequency components and these high-frequency signal components, even at relatively low power levels, will tend to "leak" from their assigned signal paths into adjacent signal paths and components. Such leakage may effect the operation of adjacent components and cause erratic functioning of certain circuit elements.

In the case of agricultural equipment, such as forage harvesters, which operate under difficult environmental conditions of vibration, temperature, and dirt, the problems are compounded.

Accordingly, it is a primary object of this invention to improve the method and apparatus for adjusting a shearbar relative to a cutterhead which is not based on pulse electrical signals to determine rotation of the cutterhead, to thereby eliminate malfunctioning due to signal leakage.

In the forage harvester described in the aforesaid patent, the cutterhead is driven (through a selectively engagable clutch) from the prime mover of the forage harvester. To assure that the cutterhead is rotating, it is therefore a necessary element that the prime mover be rotating. Rotation of the prime mover can be inferred from a number of sensors, some of which generate pulse trains (e.g. an alternator) and some of which generate a more or less steady state signal without appreciable transients (e.g. oil pressure sensors).

It is another object of this invention to infer the rotation of the prime mover of a forage harvester from a more or less steady state signal without significant transients.

SUMMARY OF THE INVENTION

In accordance with the invention, an improved method and apparatus for adjusting an shearbar relative to a cutterhead is accomplish by a sensor yielding a steady state signal to indicate rotation of the prime mover. Such steady state signal, in a preferred embodiment of the invention, is provided by an oil pressure sensor to establish one of the two necessary conditions to indicate cutterhead rotation.

The other necessary condition to determine cutterhead rotation is that a clutch, interposed in the power train between the prime mover and the cutterhead, has been actuated to thereby close a switch, the closure of which provides a second steady state signal. The two steady state signals are combined so that when both are present, cutterhead rotation is established.

In accordance with a preferred embodiment of the invention, the combination of the two steady state signals may be achieved either in software form through a sequence of program steps, or may be achieved in hard-wired form through an AND circuit.

The foregoing and other features, objects and advantages of the invention and its mode of operation will become apparent upon consideration of the following descriptions and the accompanying drawings.

DETAILED DESCRIPTION OF THE INVENTION

Figure 1:
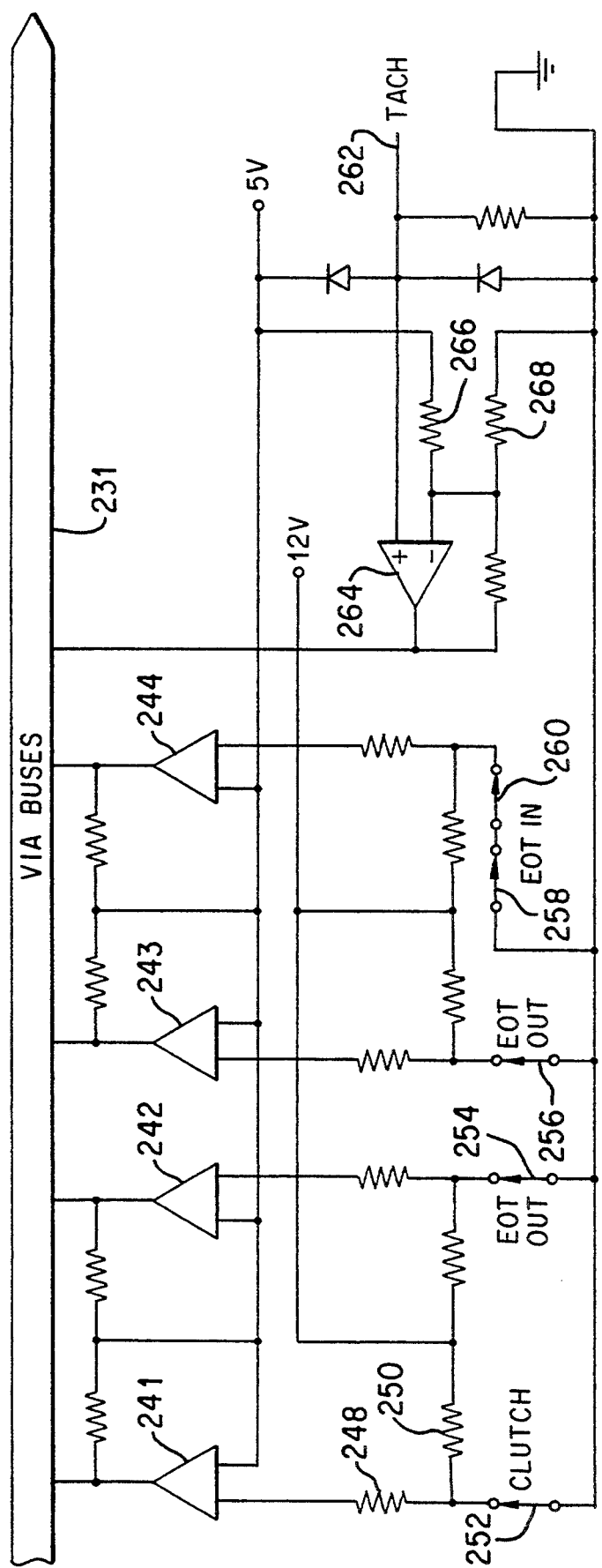
FIG. 1 comprises a partial circuit diagram of the electrical controls used in the prior art for controlling the shearbar adjustment.

With reference to FIG. 1, the prior art includes a versatile interface adaptor (VIA) (not shown) which connects the two ports of the VIA by way of two buses collectively designated 231. The bus 231 is connected, among others, to receive the outputs of a plurality of amplifiers 241-244. Amplifier 241 has one input connected to the 5 V logic supply voltage and a second input connected through two resistors 248 and 250 to the 12 V power supply. The junction between resistors 248 and 250 is connected through a switch 252 to ground. As long as switch 252 is closed the amplifier applies a logic 0 signal to the bus but when switch 252 is open the amplifier applies a logic 1 signal to the bus. The switch 252 is associated with an engage lever (not shown) which is actuated so that a chain drive (not shown) causes a cutterhead to rotate. Switch 252 is thus closed when drive power is applied to the cutterhead.

Amplifiers 242-244 are arranged in the same manner as amplifier 241 with switches 254 and 256 being associated with amplifiers 242 and 243, respectively and switches 258 and 260 being associated with amplifier 244. These switches are limit switches for sensing when the ends of the shearbar have reached their limits of travel toward or away from the cutterhead. Switches 254 and 256 are actuated when respective ends of the shearbar are at their limit of travel away from the cutterhead. Switches 258 and 260 are connected in series so that amplifier 244 produces a logic 1 output when either switch is open i.e. when either of the two ends of the shearbar is at its limit of travel toward the cutterhead. The limit switches are incorporated within the housing of motors (not shown) and are actuated by mechanical bi-directional counter mechanisms which count rotations of lead screws driving the respective ends of the shearbar.

In accordance with the prior art, a tachometer (not shown) produces a sequence of output pulses at a rate proportional to the speed of rotation of the cutterhead. These pulses are applied over a lead 262 to one input of a comparator amplifier 264. A voltage divider comprising two resistors 266 and 268 is connected between 5 volts and ground, and this reference voltage is applied from the junction of the resistors to a second input of amplifier 264. When the tachometer produces an output pulse exceeding the magnitude of the reference voltage, amplifier 264 applies a logic one signal to bit position of the VIA bus 231. These pulses are then subsequently counted by a counter (not shown).

In operation, this portion of the prior art circuitry establishes cutterhead rotation when switch 252 is actuated and when the comparator amplifier 264 applies a logic one signal to the VIA bus 231. The presence of pulses on lead 262 may lead to cross talk between adjacent circuit components and thereby cause erroneous actuation of the shearbar.

Figure 2:
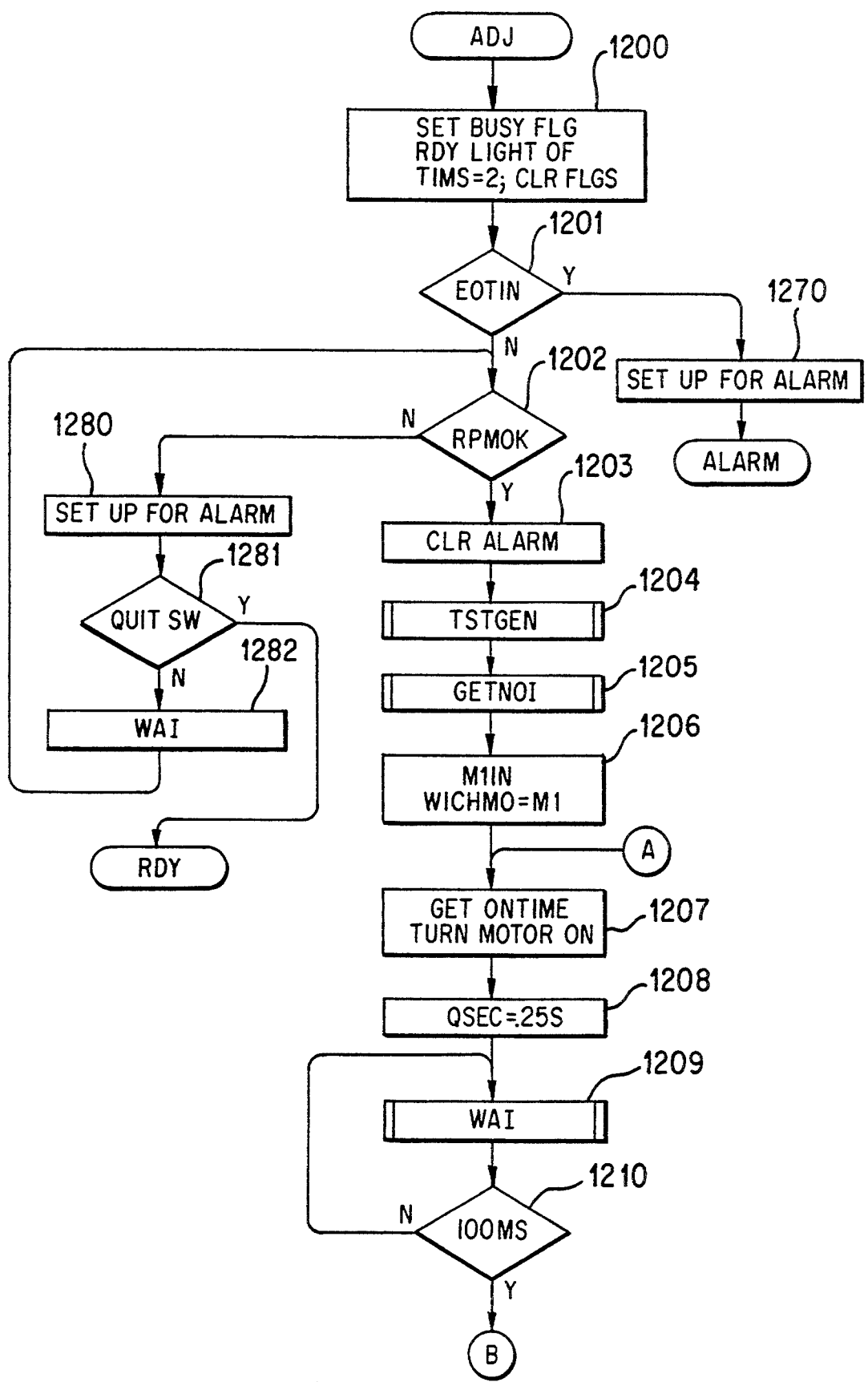
FIG. 2 is a partial flowchart showing one portion of the prior art routine in which the invention is utilized.

With reference to FIG. 2, there is shown a partial flowchart of how the prior art utilizes circuitry partially shown in FIG. 1, to go through a control routine to adjust the respective ends of a shearbar towards, or away from, the cutterhead. Briefly, the adjust routine controls at least one, preferably two, motors (not shown) and begins at step 1200 where the busy flag is set and the ready light flag is reset so that indicators (not shown) will properly indicate the status of the system. The location TIMS is set to 2. If energizations of the several motors result in impact between a rotating cutterhead and the shearbar TIMS is decremented and when TIMS equals 0, the adjustment is complete. Certain flags are also cleared at step 1200.

At step 1201 a routine EOTIN is tested to see if one of the switches 258 or 260 is actuated because one end of the shearbar is at its limit of travel toward the cutterhead. If neither switch is actuated, step 1202 checks the RPMOK okay flag to be sure that the cutterhead is rotating faster than a pre-determined minimum speed, in the manner described before. Assuming that the rpm is satisfactory, the program clears the flag for setting the rpm indicator (not shown) to proceed with further routines 1203, 1204, 1205, 1206, 1207, 1208, 1209 and 1210, all as described in more detailed in the aforesaid patent. From a review of the partial flowchart of the routine in FIG. 2, it is clear that the adjust routine cannot proceed without a satisfactory "RPMOK" test performed in step 1202. As noted before, the RPMOK routine of the prior art utilizes the simultaneously condition of switch 252 being closed and the presence of a sufficient number of tach pulses on lead 262 (FIG. 1).

Figure 3:
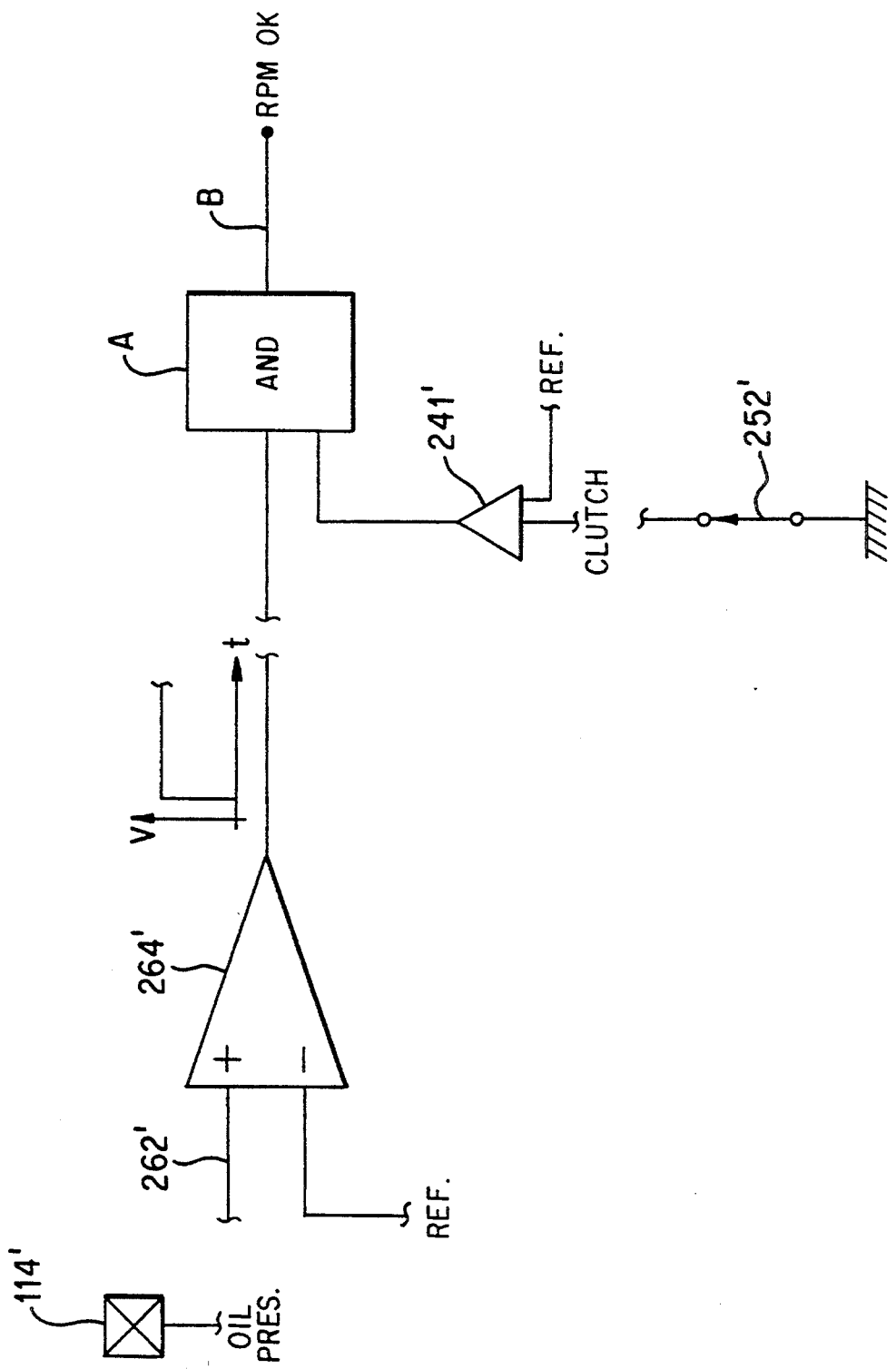
FIG. 3 shows the schematic diagram of how the prior art sensing a logic routines are modified in accordance with the invention.

With reference now to FIG. 3, the RPMOK routine is established, not through the presence of pulses with their undesirable effects, but through a sensor 114' which, instead of being a tach pulse generator, is the generator of a steady state signal reflecting the presence oil pressure in the prime mover. The signal from sensor 114 is applied VIA lead 262' to one of the inputs of a comparator amplifier 264' which has as its other input a reference signal. Whenever the steady state oil pressure sensor 114' exceeds the reference signal provided to amplifier comparator 264', the amplifier comparator 264' will generate a steady state voltage signal, as illustrated, on its output lead. The presence of such a steady state voltage level on the output terminal of comparator amplifier 264 establishes one of the necessary conditions to indicate cutterhead rotation. It is noted that while an oil pressure sensor will yield a somewhat varying signal dependent upon prime mover rpm and oil temperature, the signal produced is an essentially steady state signal free of any substanital transient components.

The other necessary condition to establish that the cutterhead RPMOK routine is satisfied is provided via a switch 252' the closure of which indicates engagement of the clutch interposed in the power train between the prime mover and the cutterhead. The closed switch feeds one of the two inputs of an amplifier 241' so that when switch 252' is closed the amplifier 241 provides a second logic one signal to the AND operation A which may be achieved through either software programming or through a logical AND circuit. When both inputs to the AND circuit/operation A are at logic one levels, the operation A will produce an RPMOK signal on its output terminal B to provide a signal so that may be used in step 1202 described with reference to FIG. 2 to initiate further control action.

The absence of pulse signals with their attendant high frequency components thus eliminates one possible cause for erroneous shearbar adjustment.

As noted before, the replacement of a pulse signal by a steady state signal is preferably accomplished according to the invention, by the utilization of an oil pressure sensor 114'. However, it is also possible, and within scope of the invention, to derive a steady state signal indicating prime mover rotation through utilization of a current monitor to indicate flow of current from an alternator which is conventionally a part of the prime mover of a forage harvester.

While the invention has been particularly shown with reference to a preferred embodiments, it will be understood by those skilled in the art that the foregoing and other changes inform and details may be made therein without departing from the spirit and scope of the invention as defined in the claims attached hereto.

What is claimed is:

1. In machinery employing a prime mover which is coupled through a clutch to drive a rotatable member, and in which rotation of the rotatable member has to be established prior to initiating control action, the improvement comprising:
    first means for producing a first steady state electrical signal substantially free of transients to indicate rotation of the prime mover;
    second means for producing a second steady state electrical signal substantially free of transients to indicate that the clutch, interposed between the prime mover and the rotatable member, is engaged to drive said rotatable member in rotation; and
    third means for combining the first and second steady state signals so that rotation of the rotatable member is established when both the first and second steady state signals are present.

2. Apparatus according to claim 1 wherein the first means comprises an oil pressure sensor for indicating the presence of oil pressure in the oil supply system of the prime mover.

3. Apparatus according to claim 1 wherein the second means comprises a switch to indicate engagement of the clutch.

4. Apparatus according to claim 1 wherein the third means comprises an AND circuit.

5. Apparatus according to claim 1 wherein the rotatable member is a cutterhead in a forage harvester.

* * * * *